United States Patent
Tang et al.

(10) Patent No.: US 12,481,389 B2
(45) Date of Patent: Nov. 25, 2025

(54) DISPLAY PANEL AND DISPLAY WITH CONDUCTIVE ENCLOSURE STRUCTURE TO CONNECT TOUCH ELECTRODES

(71) Applicant: HKC CORPORATION LIMITED, Shenzhen (CN)

(72) Inventors: Yangling Tang, Shenzhen (CN); Zhisheng Xie, Shenzhen (CN); Qin Liang, Shenzhen (CN); Zhi Yang, Shenzhen (CN); Xiufeng Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/822,110

(22) Filed: Aug. 31, 2024

(65) Prior Publication Data

US 2025/0085801 A1  Mar. 13, 2025

(30) Foreign Application Priority Data

Sep. 13, 2023 (CN) .......................... 202311184861.5

(51) Int. Cl.
*G06F 3/041* (2006.01)
*G06F 3/044* (2006.01)
(Continued)

(52) U.S. Cl.
CPC .......... *G06F 3/0416* (2013.01); *G06F 3/0412* (2013.01); *G06F 3/0443* (2019.05);
(Continued)

(58) Field of Classification Search
CPC .... G06F 3/0416; G06F 3/0412; G06F 3/0443; G06F 3/0446; G06F 2203/0411; H10K 59/122; H10K 59/40; H10K 59/873
See application file for complete search history.

(56) References Cited

U.S. PATENT DOCUMENTS

2022/0075469 A1* 3/2022 Xia ....................... G06F 3/0412
2023/0418422 A1* 12/2023 Zeng ..................... G06F 3/0412

FOREIGN PATENT DOCUMENTS

CN 115020621 A 9/2022
CN 116056510 A 5/2023
(Continued)

OTHER PUBLICATIONS

Chinese First Office Action, Chinese Application No. 202311184861. 5, mailed May 15, 2024 (10 pages).
(Continued)

*Primary Examiner* — Liliana Cerullo

(57) ABSTRACT

A display panel includes a driving substrate, a conductive enclosure structure arranged on the driving substrate and including an insulation layer and a plurality of first metal layers, and a touch control electrode layer arranged on a side of the conductive enclosure structure away from the driving substrate. The insulation layer and the plurality of first metal layers are stacked in sequence along a direction away from the driving substrate. The plurality of first metal layers are arranged on a same plane at intervals. The touch control electrode layer includes a plurality of first touch control electrodes. The plurality of first touch control electrodes extend to the plurality of first metal layers, and adjacent electrodes of the plurality of first touch control electrodes are bridged through the corresponding one of the plurality of first metal layers. A display device is also provided.

19 Claims, 15 Drawing Sheets

(51) Int. Cl.
 _H10K 59/122_ (2023.01)
 _H10K 59/40_ (2023.01)
 _H10K 59/80_ (2023.01)

(52) U.S. Cl.
 CPC ......... _G06F 3/0446_ (2019.05); _H10K 59/122_ (2023.02); _H10K 59/40_ (2023.02); _H10K 59/873_ (2023.02); _G06F 2203/04111_ (2013.01)

(56) References Cited

FOREIGN PATENT DOCUMENTS

| | | |
|---|---|---|
| CN | 116075197 A | 5/2023 |
| CN | 116056510 B | 6/2023 |

OTHER PUBLICATIONS

Chinese Notification to Grant Patent Right for Invention, Chinese Application No. 202311184861.5, mailed Jun. 24, 2024 (5 pages).

* cited by examiner an original layer of second metal layer, an original layer of second insulation layer, an original layer of first insulation layer, and an original layer of first metal layer are sequentially formed on the pixel definition layer; the original layer of second metal layer covers the anode and the pixel definition layer; a width of the original layer of second metal layer, a width of the original layer of second insulation layer, a width of the original layer of first insulation layer, and a width of the original layer of first metal layer are the same ——S1211 a photoresist layer is coated on a side of the original layer of first metal layer away from the original layer of first insulation layer ——S1212 the photoresist layer is patterned, and based on the patterned photoresist layer, etching processes are performed sequentially to obtain the plurality of first metal layers, the first insulating layer, the second insulating layer, and the second metal layer; each of the width of the insulation layer and the second metal layer are less than the width each of the plurality of first metal layers, and the photoresist layer is removed ——S1213

FIG. 8

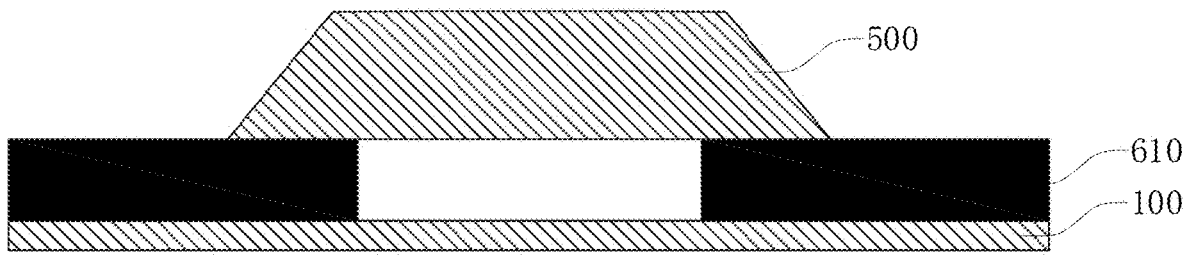

FIG. 8a

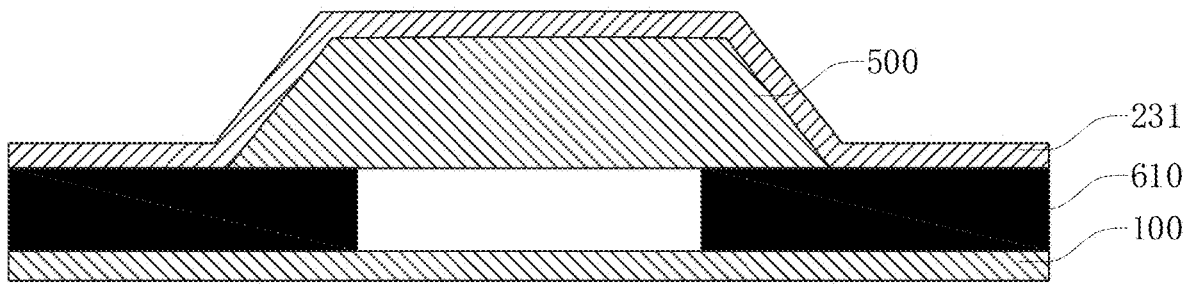

FIG. 8b

DISPLAY PANEL AND DISPLAY WITH CONDUCTIVE ENCLOSURE STRUCTURE TO CONNECT TOUCH ELECTRODES

CROSS REFERENCE TO RELATED APPLICATIONS

The present disclosure claims priority of Chinese Patent Application No. 202311184861.5, filed on Sep. 13, 2023, the entire contents of which are hereby incorporated by reference in their entireties.

TECHNICAL FIELD

The present disclosure relates to the technical field of displays, in particular to a display panel and a display device.

BACKGROUND

Nowadays, for an organic light emitting diode (OLED) product with a mutual capacitive structure, the manufacturing process thereof includes the following operations: placing a touch control electrode layer on an upper layer of an encapsulation layer, forming a first touch control electrode and a second touch control electrode where two separate metal mask layers are required. In this way, the number of masks is increased, such that the manufacturing process may be more complex. Therefore, how to reduce the number of masks in the manufacturing process is an urgent problem to be solved.

SUMMARY OF THE DISCLOSURE

According to a first aspect, the present disclosure provides a display panel. The display panel includes a driving substrate; a conductive enclosure structure arranged on the driving substrate, where the conductive enclosure structure includes an insulation layer and a plurality of first metal layers, the insulation layer and the plurality of first metal layers are stacked in sequence along a direction away from the driving substrate, and the plurality of first metal layers are arranged at intervals on a same plane; and a touch control electrode layer arranged on a side of the conductive enclosure structure away from the driving substrate, where the touch control electrode layer includes a plurality of first touch control electrodes, the plurality of first touch control electrodes extend to the plurality of first metal layers, and adjacent electrodes of the plurality of first touch control electrodes are bridged through a corresponding one of the plurality of first metal layers.

According to a second aspect, the present disclosure provides a display device, including the above-mentioned display panel.

Other features and advantages of the present disclosure will be apparent through the following detailed description, or will be acquired in part by the practice of the present disclosure.

It should be understood that the above general description and the detailed description below are only illustrative and explanatory, and do not limit the present disclosure.

BRIEF DESCRIPTION OF THE DRAWINGS

The drawings are incorporated in and constitute a part of the specification, illustrate embodiments in accordance with the present disclosure and together with the description serve to explain the principle of the present disclosure. Apparently, the drawings described below only illustrate some embodiments, an ordinary skilled person in the art may obtain other drawings based on these drawings, without making any creative work.

FIG. 8 is a first flow chart of a method of for manufacturing a conductive enclosure structure according to some embodiments of the present disclosure.

FIG. 8a is a first structural schematic view of the conductive enclosure structure according to some embodiments of the present disclosure.

FIG. 8b is a second structural schematic view of the conductive enclosure structure according to some embodiments of the present disclosure.

Figure 1:
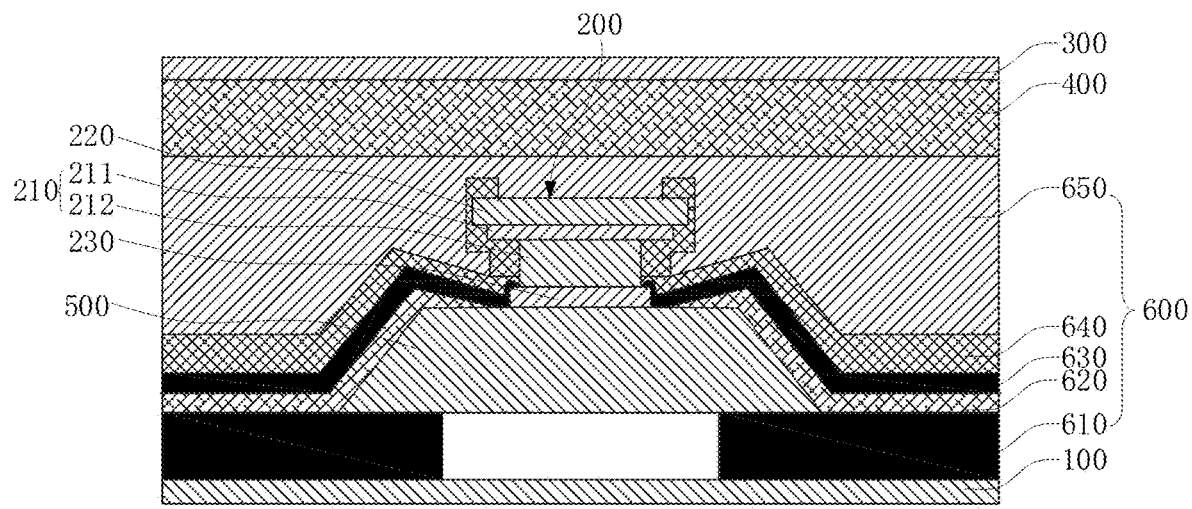
FIG. 1 is a first structural schematic view of a display panel according to some embodiments of the present disclosure.

REFERENCE NUMERALS DESCRIPTION driving substrate 100; conductive enclosure structure 200; insulation layer 210; first insulation layer 211; original layer 2110 of first insulation layer; second insulation layer 212; original layer 2120 of second insulation layer; first metal layer 220; original layer 221 of first metal layer; second metal layer 230; original layer 231 of second metal layer; touch control electrode layer 300; first touch control electrode 310; first bridging portion 311; second bridging portion 312; second touch control electrode 320; integrated chip 330, organic protection layer 400; pixel definition layer 500; sub pixel 600; anode 610; organic light-emitting layer 620; cathode 630; insulation protection layer 640; first encapsulation layer 650; second encapsulation layer 660; photoresist layer 700.

DETAILED DESCRIPTION

Exemplary embodiments will be described more comprehensively by referring to accompanying drawings now. However, the exemplary arrangements may be embodied in various forms and should not be construed as limited to the embodiments set forth herein; rather, these embodiments are provided such that the present disclosure will be made thorough and complete, and the concept of exemplary embodiments will be fully conveyed to those skilled in the art.

Furthermore, the described features, structures, or characteristics may be combined in any suitable manner in one or more embodiments. In the following description, many specific details are provided to give a full understanding of the embodiments of the present disclosure. However, those skilled in the art will realize that the technical solution of the present disclosure may be practiced without one or more specific details, or other methods, components, devices, steps, etc. In other cases, well-known methods, devices, implementations or steps are not shown or described in detail to avoid blurring various aspects of the present disclosure.

The present disclosure will be further detailed below in combination with the accompanying drawings and specific embodiments. It should be noted herein that the technical features involved in the various embodiments of the present disclosure described below combined with each other as long as they do not conflict with each other. The embodiments described below with reference to the accompanying drawings are exemplary and are intended to explain the present disclosure, and cannot be construed as limiting the present disclosure.

It should be noted that "a plurality of" mentioned in the present disclosure refers to two or more. A term "and/or" is only a description of an association relationship of associated objects, indicating that three relationships may exist, for example, A and/or B, which may indicate: the existence of A alone, the existence of both A and B, and the existence of B alone. In addition, a character "/" generally indicates that the front and rear associated objects are in an "or" relationship.

Nowadays, for an organic light emitting diode (OLED) product with a mutual capacitive structure, the manufacturing process thereof includes the following operations: placing a touch control electrode layer on an upper layer of an encapsulation layer, forming a first touch control electrode and a second touch control electrode where two separate metal mask layers are required. In this way, the number of masks is increased, such that the manufacturing process may be more complex. Therefore, how to reduce the number of masks in the manufacturing process is an urgent problem to be solved.

As shown in FIG. 1, in order to solve the above technical problem, the present disclosure provides a display panel. The display panel includes a driving substrate 100, a conductive enclosure structure 200, and a touch control electrode layer 300. The conductive enclosure structure 200 is arranged on the driving substrate 100. The conductive enclosure structure includes an insulation layer 210 and a plurality of first metal layers 220. The insulation layer 210 and the plurality of first metal layers 220 are stacked in sequence along a direction away from the driving substrate 100. The plurality of first metal layers 220 are arranged on a same plane at intervals. The touch control electrode layer 300 is arranged on a side of the conductive enclosure structure 200 away from the driving substrate 100. The touch control electrode layer 300 includes a plurality of first touch control electrodes 310 (referring to FIG. 2). The plurality of first touch control electrodes 310 extend to the plurality of first metal layers 220, and adjacent electrodes of the plurality of first touch control electrodes 310 are bridged through the corresponding one of the plurality of first metal layers 220. In this way, each of the plurality of first touch control electrodes 310 is bridged through adjacent layers of the plurality of first metal layers 220, or the adjacent electrodes of the plurality of first touch control electrodes 310 multiplex the corresponding one of the plurality of first metal layers 220 for signal transmission. When manufacturing the touch control electrode layer 300, it may be possible to reduce a mask corresponding to the first metal layer multiplexed, thereby reducing the manufacturing cost.

In some embodiments, a material of the first metal layer 220 includes, but not limited to, indium zinc oxide, copper, aluminum, etc., which is not limited herein.

Figure 2:
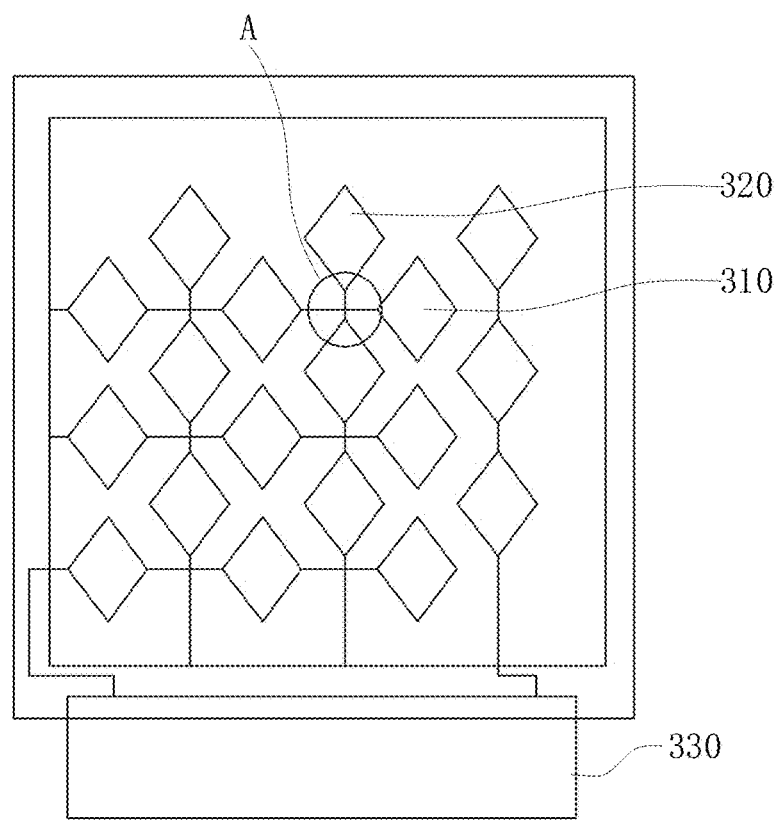
FIG. 2 is a structural schematic view of a touch control electrode layer of the display panel according to some embodiments of the present disclosure.
Figure 3:
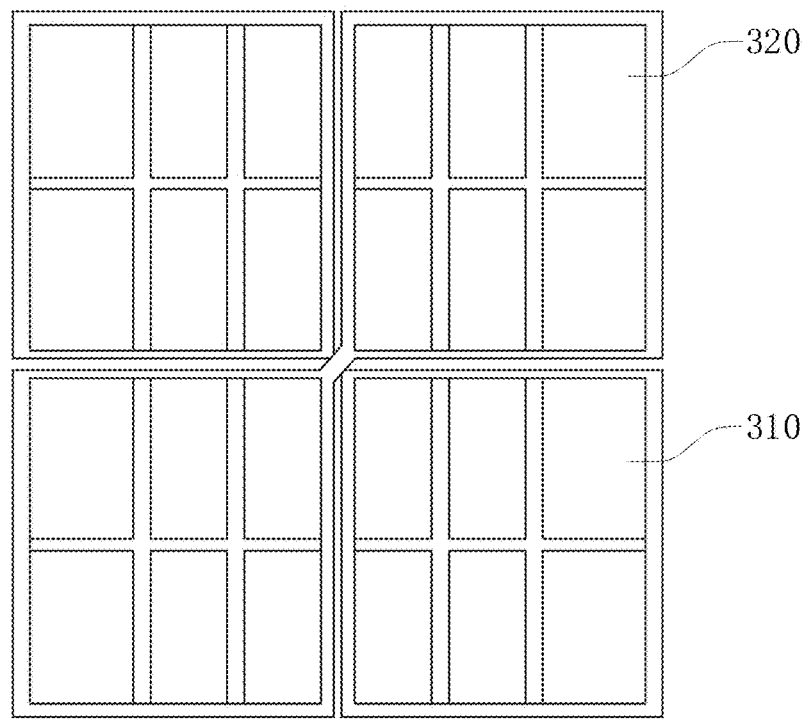
FIG. 3 is an enlarged view of an area A in FIG. 2.

In some embodiments, as shown in FIG. 2 and FIG. 3, the touch control electrode layer 300 further includes a plurality of second touch control electrodes 320. The plurality of second touch control electrodes 320 are insulated from the plurality of first touch control electrodes 310. The plurality of first touch control electrodes 310 are intersecting with the plurality of second touch control electrodes 320 on a same layer. Each of the plurality of first touch control electrodes 310 is electrically connected to the integrated chip 330 through a signal line of the corresponding first touch control electrode. Each of the plurality of second touch control electrodes 320 is electrically connected to the integrated chip 330 through a signal line of the corresponding second touch control electrode. The integrated chip 330 may provide a first self-capacitance scanning signal and a second self-capacitance scanning signal, such that a touch control display panel may reduce the number of touch control electrodes occupying pins of the integrated chip 330 while realizing self-capacitance detection.

In some embodiments, as shown in FIG. 2 and FIG. 3, a cross-latticed shape is formed by the plurality of first touch control electrodes 310 and the plurality of second touch control electrodes 320. The number of the first signal lines is multiple, and the multiple first signal lines are parallel to each other. The number of the second signal lines is multiple, and the multiple second signal lines are parallel to each other. Each of the first touch control electrode 310 and the second touch control electrode 320 is in a diamond shape. A shape of each of the first touch control electrode 310 and the second touch control electrode 320 may be, but not limited to, rectangle, circle, triangle, etc., which is not specifically defined herein.

In some embodiments, the first touch control electrode 310 may be a transmission electrode (Tx for short), and the second touch control electrode 320 may be a reception electrode (Rx for short). However, in other embodiments, the first touch control electrode 310 may also be the reception electrode, and the second touch control electrode 320 may also be the transmission electrode, which is not limited herein.

Figure 4:
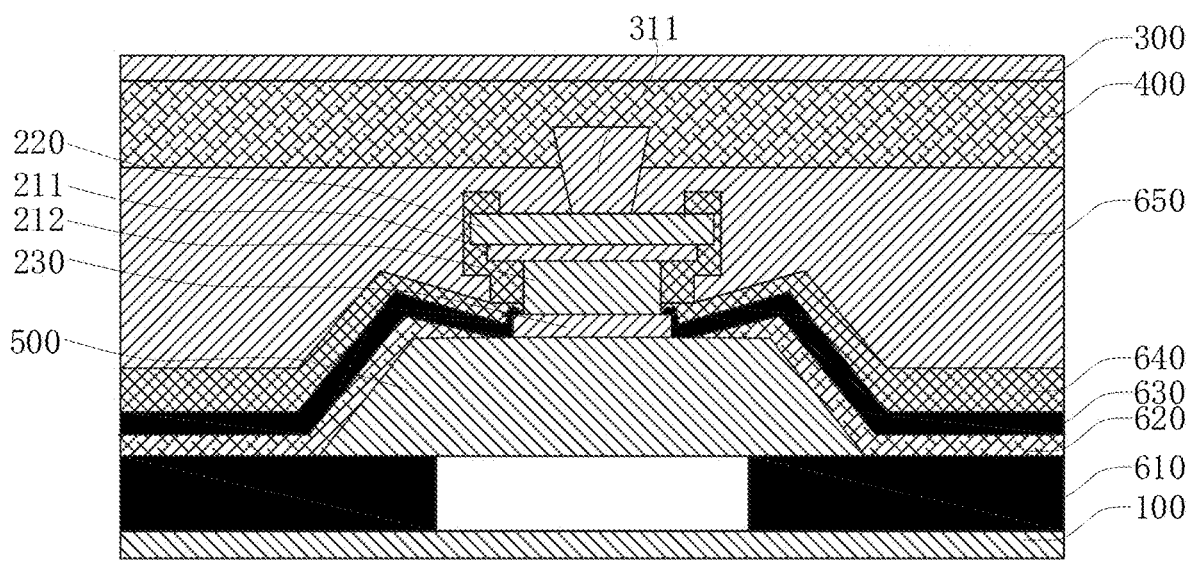
FIG. 4 is a second structural schematic view of the display panel according to some embodiments of the present disclosure.
Figure 5A:
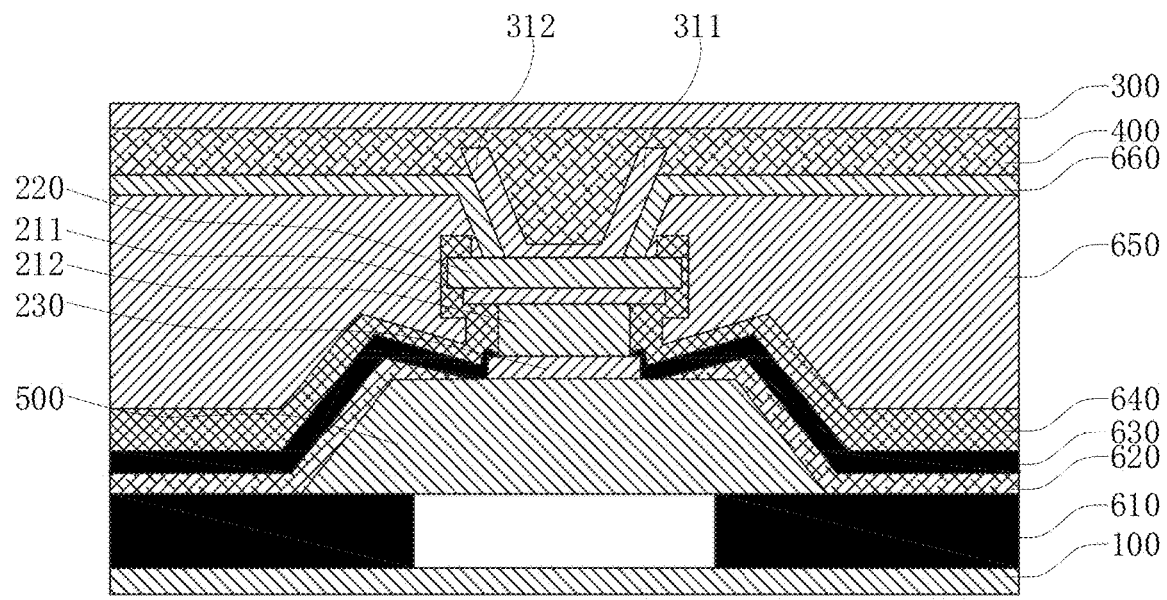
FIG. 5a is a third structural schematic view of the display panel according to some embodiments of the present disclosure.

In some embodiments, as shown in FIG. 4 and FIG. 5a, the display panel further includes an organic protection layer 400. The organic protection layer 400 is arranged between the touch control electrode layer 300 and the plurality of first metal layers 220. The organic protection layer 400 extends between adjacent layers of the plurality of first metal layers 220. The plurality of first touch control electrode 310 are insulated from the plurality of the second touch control electrode 320 through the organic protection layer 400. The adjacent layers of the plurality of first metal layers 220 are insulated from each other through the organic protection layer 400. The organic protection layer 400 is an organic material, and it may be possible to achieve insulation between the plurality of first touch control electrode 310 and the plurality of the second touch control electrode 320, and achieve insulation between the adjacent layers of the plurality of first metal layers 220 through the insulation performance of the organic material.

In some embodiments, as shown in FIG. 4 and FIG. 5a, at least one of the plurality of first touch control electrodes 310 is disconnected at an intersection between the at least one of the plurality of first touch control electrodes 310 and at least one of the plurality of second touch control electrodes 320, and is bridged through the corresponding first metal layer 220. The at least one of the plurality of first touch control electrodes 310 and the at least one of the plurality of first touch control electrodes 320 are jumpered at the intersection through the corresponding first metal layer 220, so as to multiplex the first metal layer 220 for signal transmission.

In some embodiments, as shown in FIG. 4 and FIG. 5a, each of the plurality of first touch control electrode 310 includes a first bridging portion 311 and a second bridging portion 312. The first bridging portion 311 corresponding to one of the adjacent electrodes of the plurality of first touch control electrodes 310 and the second bridging portion 312 corresponding to the other of the adjacent electrodes of the plurality of first touch control electrodes 310 are connected to a same first metal layer 220. The first bridging portion 311 and the second bridging portion 312 are arranged two ends of the first touch control electrode 310 at intervals, and the first bridging portion 311 corresponding to one of the adjacent electrodes of the plurality of first touch control electrodes 310 and the second bridging portion 312 corresponding to the other of the adjacent electrodes of the plurality of first touch control electrodes 310 are bridged with a corresponding one of the plurality of first metal layers 220.

In some embodiments, as shown in FIG. 4, the first touch control electrode 310 is located in a front-rear direction, and the second touch control electrode 320 is located in a left-right direction. As shown in FIG. 5a, the first touch control electrode 310 is located in the left-right directions, and the second touch control electrode 320 is located in the front-rear direction.

In some embodiments, as shown in FIG. 5a, the first bridging portion 311 and the second bridging portion 312 are arranged at intervals. The second touch control electrode 320 passes through a gap/an interval between the first bridging portion 311 and the second bridging portion 312. The first bridging portion 311 and the second bridging portion 312 extend towards a side of the first metal layer 220 away from the driving substrate 100. The first metal layer 220 corresponds to one of two ends of the first bridging portion 311 and the second bridging portion 312, and the first touch control electrode 310 corresponds to the other of two ends of the first bridging portion 311 and the second bridging portion 312. The gap is formed between the first bridging portion 311 and the second bridging portion 312, and is configured for the second touch control electrode 320 to pass through, such that the jumper may be performed between the first touch control electrode 310 and the second touch control electrode 320. In this way, it may be possible to achieve better insulation performance for the first touch control electrode 310 and the second touch control electrode 320.

In some embodiments, as shown in FIG. 5a, the conductive enclosure structure 200 further includes a second metal layer 230 arranged on a side of the insulation layer 210 away from the first metal layer 220. A width of the first metal layer 220 is greater than a width of the second metal layer 230. In this way, the shielding may be formed when the display panel is coated with a cathode 630 and an organic light-emitting layer 620 by evaporation, such that the organic light-emitting layer 620 is not in contact with the second metal layer 230.

In some embodiments, during the evaporation of the organic light-emitting layer 620, there is an evaporation angle of the organic light-emitting layer 620 between the second metal layer 230 and the first metal layer 220. During the evaporation of the cathode 630, there is an evaporation angle of the cathode 630 between the second metal layer 230 and the first metal layer 220. The evaporation angle of the organic light-emitting layer 620 is greater than the evaporation angle of the cathode 630. Thus, the organic light-emitting layer 620 is not in contact with the second metal layer 230, and the cathode 630 is in contact with the second metal layer 230.

In some embodiments, as shown in FIG. 5*a*, the insulation layer 210 includes a first insulation layer 211 and a second insulation layer 212. The first insulation layer 211 is arranged close to the first metal layer 220, and the second insulation layer 212 is arranged close to the second metal layer 230. A width of the second insulation layer 212 is less than a width of the first insulation layer 211. A width of the first insulation layer 211 is greater than a width of the second metal layer 230, and the width of the second insulation layer 212 is less than a width of the first metal layer 220. On the one hand, the width of the second insulation layer 212 is less than that of the first insulation layer 211, which not only serves as insulation but also serves as transitional support, thereby making the conductive enclosure structure 200 more stable. On the other hand, the width of the second insulation layer 212 is less than that of the first metal layer 220, so as to increase a length of the first metal layer 220 exposed on the insulation layer 210. In this way, when the evaporation is performed on the cathode 630, it may be easier for the second metal layer 230 to contact with the cathode 630.

In some embodiments, a material of the second metal layer 230 includes, but not limited to, indium zinc oxide, copper, aluminum, etc. A material of each of the first insulation layer 211 and the second insulation layer 212 includes, but not limited to, silicon oxides, nitrogen oxides, etc. The material of the first insulation layer 211 may be the same as or different from that of the second insulation layer 212, which is not limited herein.

In some embodiments, as shown in FIG. 5*a*, the display panel further includes a pixel definition layer 500 and a plurality of sub pixels 600. The pixel definition layer 500 is configured to separate the plurality of sub pixels 600. The pixel definition layer 500 is arranged on the driving substrate 100, the conductive enclosure structure 200 is arranged on a side of the pixel definition layer 500 away from the driving substrate 100, and the pixel definition layer 500 and the conductive enclosure structure 200 protrude from the driving substrate 100 to enclose and form a pixel accommodation region. The plurality of sub pixels 600 are arranged in the pixel accommodation region.

Furthermore, each of the plurality of sub pixels 600 includes an anode 610, the organic light-emitting layer 620, and the cathode 630. The anode 610 is arranged on the driving substrate 100 in the pixel accommodation region. The organic light-emitting layer 620 is arranged on the anode 610. The cathode 630 is arranged on the organic light-emitting layer 620 and is in contact with the second metal layer 230 of the conductive enclosure structure 200.

In some embodiments, a pixel definition layer 500 is made on the anode 610 of the each of the plurality of sub pixels 600, and the pixel definition layer 500 is exposed and developed to form a pixel opening above the anode 610 of the each of the plurality of sub pixels 600. In addition, the pixel definition layer 500 partially covers the anode 610 of the each of the plurality of sub pixels 600. An organic light-emitting material is evaporated on the pixel definition layer 500 and the anode 610 to form the organic light-emitting layer 620. A cathode material is evaporated on the organic light-emitting layer 620 to form the cathode 630.

In some embodiments, the pixel definition layer 500 may be made of an organic material. The material of the anode 610 may include, but not limited to, aluminum, silver and oxides thereof, indium tin oxide, indium zinc oxide, a stack of metal and indium tin oxide, or a stack of metal and indium tin oxide. A material of the cathode 630 may include, but not limited to, a metal material such as aluminum (Al), gold (Au), silver (Ag), aluminum magnesium alloy (Mg—Ag), etc. The anode 610 may be deposited into the each of the plurality of sub pixels 600 by means of evaporative coating or sputtering coating.

In some embodiments, the display panel includes a plurality of pixels for emitting light of different colors, and the plurality of pixels emit light to display an image. Each of the plurality of pixels is overlaid and mixed with sub pixels of three colors, Red, Green, and Blue, so as to achieve the display of a white image. In addition, different color images are also displayed by controlling the brightness of sub pixels 600 of different colors.

In some embodiments, as shown in FIG. 5*a*, the display panel further includes an insulation protection layer 640. The insulation protection layer 640 is arranged on the cathode 630 and extends along the conductive enclosure structure 200 to the first metal layer 220 of the conductive enclosure structure 200. The insulation protection layer 640 is configured to provide insulation protection for the cathode 630 and the conductive enclosure structure 200. The first encapsulation layer 650 may be an inorganic encapsulation layer. A material of the first encapsulation layer 650 may include, but not limited to, silicon nitride, silicon oxynitride, a combination thereof, etc.

In some embodiments, as shown in FIG. 5*a*, the display panel further includes a first encapsulation layer 650 arranged on the insulation protection layer 640. A height of the first encapsulation layer 650 is at least higher than a height of the conductive enclosure structure 200. The first encapsulation layer 650 plays a filling protection role in the sub pixel 600, so as to protect a structure of the sub pixel 600 during a process of manufacturing the display panel structure in the future.

In some embodiments, the first encapsulation layer 650 is arranged between the organic protection layer 400 and the insulation protection layer 640, and the organic protection layer 400 is prepared after the first encapsulation layer 650 is formed in the sub pixel 600.

In some embodiments, as shown in FIG. 5*a*, the anode 610 is formed on the driving substrate 100, and the pixel definition layer 500 is formed between adjacent anodes 610. The conductive enclosure structure 200 is formed above the pixel definition layer 500, and the organic light-emitting layer 620 is formed above the anode 610. The organic light-emitting layer 620 extends towards the pixel definition layer 500 to the side of the pixel definition layer 500 close to the second metal layer 230, and the second metal layer 230 and the organic light-emitting layer 620 are arranged at intervals. In this way, the second metal layer 230 is not in contact with the organic light-emitting layer 620, and the cathode 630 is formed above the organic light-emitting layer 620. The insulation protection layer 640 is formed on the cathode 630, and extends along the conductive enclosure structure 200 to the first metal layer 220 of the conductive enclosure structure 200, and the first encapsulation layer 650 and the organic protection layer 400 are sequentially formed on the insulation protection layer 640.

In some embodiments, as shown in FIG. 5*a*, a plurality of second encapsulation layers 660 are further arranged between the first encapsulation layer 650 and the organic protection layer 400. The plurality of second encapsulation layers 660 are arranged in the plurality of sub pixels 600 in one-to-one correspondence, and are disposed on two corresponding sides of the first bridge section 311 and the second bridge section 312, so as to realize pixel-level encapsulation for the plurality of sub pixels 600.

Figure 5B:
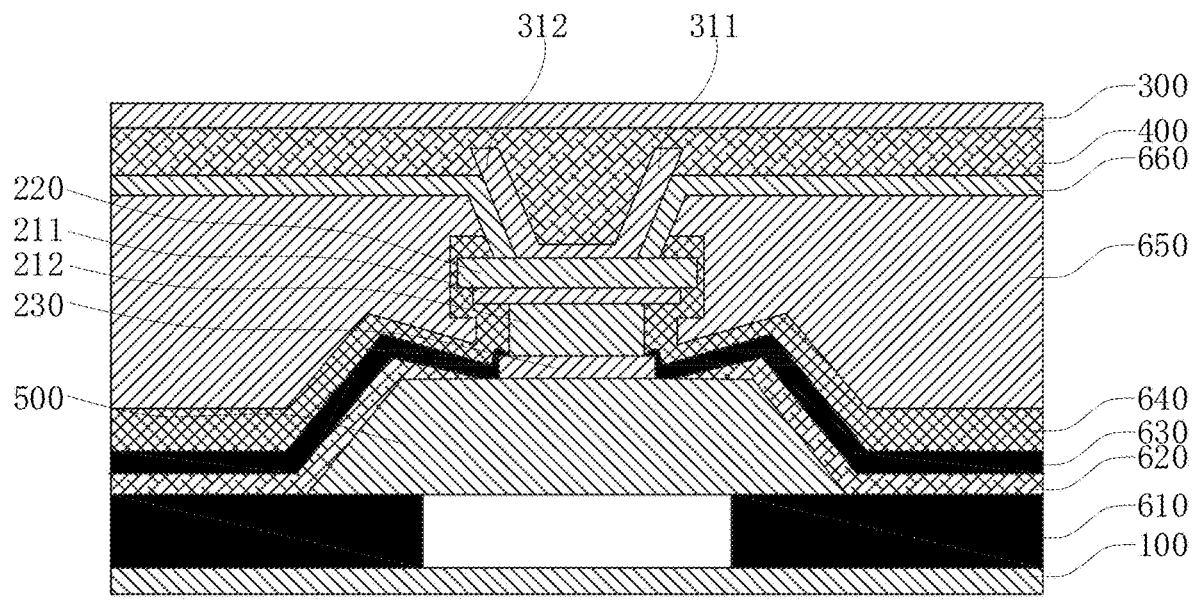
FIG. 5b is a fourth structural schematic view of the display panel according to some embodiments of the present disclosure.

In some embodiments, as shown in FIG. 5*a*, the second encapsulation layer 660 and the insulation protection layer 640 are arranged above the first metal layer 220 at intervals. That is, the second encapsulation layer 660 is not overlapped with the insulation protection layer 640, and a bottom cut morphology may be formed on the first metal layer 220 during an etching process. The first encapsulation layer 650 may fill a gap/an interval between the second encapsulation layer 660 and the insulation protection layer 640, reducing the risk of the insulation protection layer 640 falling off. In another embodiment, as shown in FIG. 5*b*, the second encapsulation layer 660 is overlapped with the insulation protection layer 640 above the first metal layer. In this way, a region above the first metal layer 220 may be sealed, so as to reduce the impact on the first metal layer due to etching, and thus it may further achieve pixel-level encapsulation for the plurality of sub pixels 600.

Figure 6:
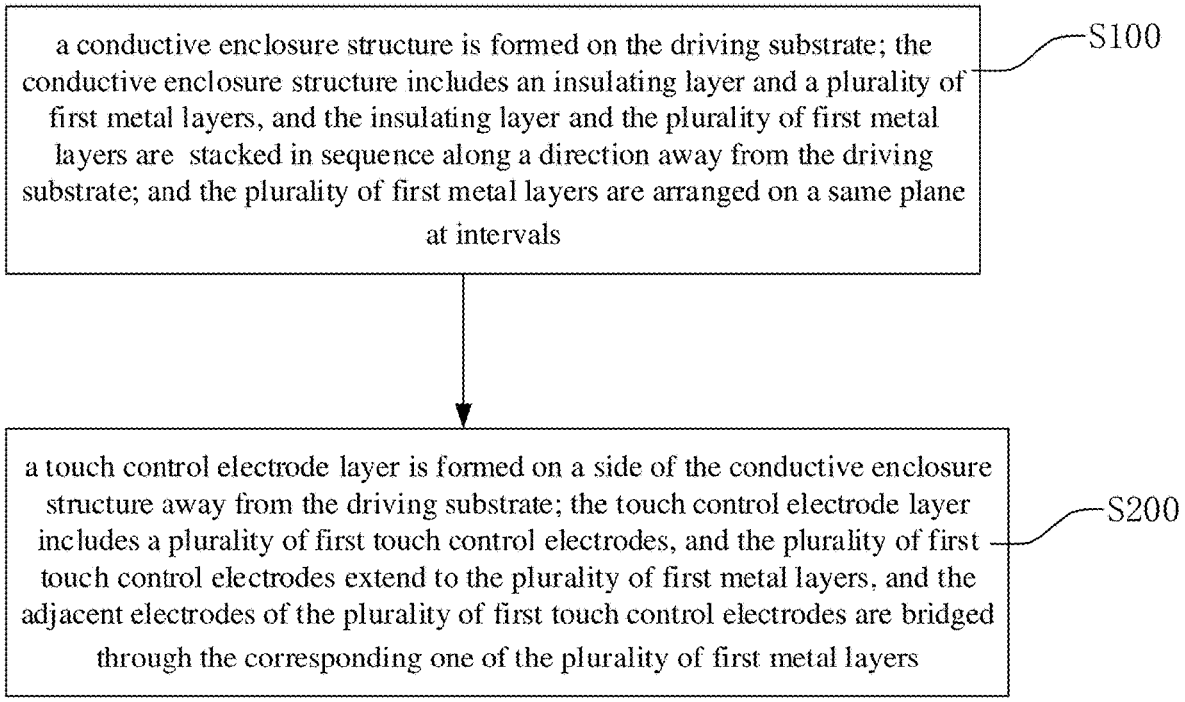
FIG. 6 is a first flow chart of a method for manufacturing the display panel according to some embodiments of the present disclosure.

As shown in FIG. 6, a method of manufacturing the above-mentioned display panel may be further provided by some embodiments of the present disclosure. The method may include the following operations.

At block S100, a conductive enclosure structure 200 is formed on the driving substrate 100. The conductive enclosure structure 200 includes an insulating layer 210 and a plurality of first metal layers 220, and the insulating layer 210 and the plurality of first metal layers 220 are stacked in sequence along a direction away from the driving substrate 100. The plurality of first metal layers 220 are arranged on a same plane at intervals.

At block S200, a touch control electrode layer 300 is formed on a side of the conductive enclosure structure 200 away from the driving substrate 100. The touch control electrode layer 300 includes a plurality of first touch control electrodes 310, and the plurality of first touch control electrodes 310 extend to the plurality of first metal layers 220, and the adjacent electrodes of the plurality of first touch control electrodes 310 are bridged through the corresponding one of the plurality of first metal layers 220.

Each of the plurality of first touch control electrode 310 is bridged through adjacent layers of the plurality of first metal layers 220, or the adjacent electrodes of the plurality of first touch control electrodes 310 multiplex the corresponding one of the plurality of first metal layers 220 for signal transmission. When manufacturing the touch control electrode layer 300, it may be possible to reduce a mask corresponding to the first metal layer multiplexed, thereby reducing the manufacturing cost.

Figure 7:
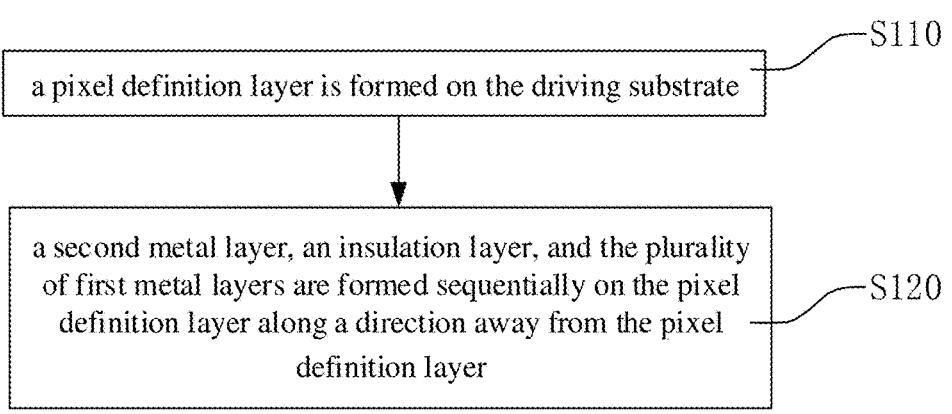
FIG. 7 is a second flow chart of a method for manufacturing the display panel according to some embodiments of the present disclosure.

Further, as shown in FIG. 7, a method of manufacturing the conductive enclosure structure 200 includes the following operations.

At block S110, a pixel definition layer 500 is formed on the driving substrate 100.

At block S120, a second metal layer 230, an insulation layer 210, and the plurality of first metal layers 220 are formed sequentially on the pixel definition layer 500 along the direction away from the pixel definition layer 500.

A plurality of sub pixels 600 may be separated from each other by the pixel definition layer 500 and the conductive enclosure structure 200 formed on the pixel definition layer 500. A corresponding one of the plurality of first metal layer 220 may be configured to bridge the plurality of first touch control electrodes 310, such as adjacent electrodes of the plurality of first touch control electrodes 310. The second metal layer 230 may be configured to bridge adjacent cathodes 630 between adjacent sub pixels of the plurality of sub pixels 600.

Figure 8C:
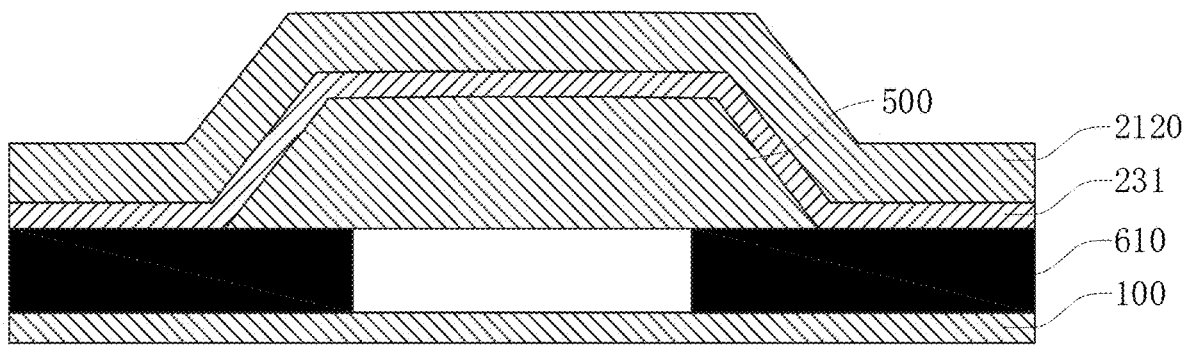
FIG. 8c is a third structural schematic view of the conductive enclosure structure according to some embodiments of the present disclosure.
Figure 8D:
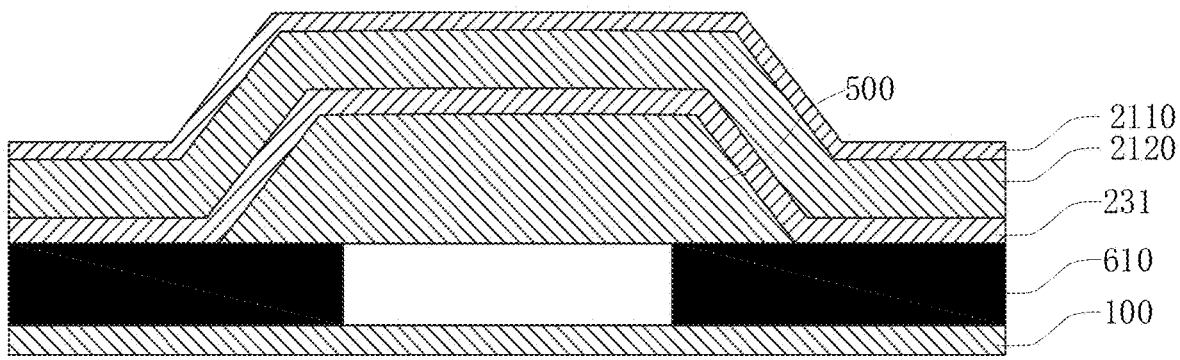
FIG. 8d is a fourth structural schematic view of the conductive enclosure structure according to some embodiments of the present disclosure.
Figure 8E:
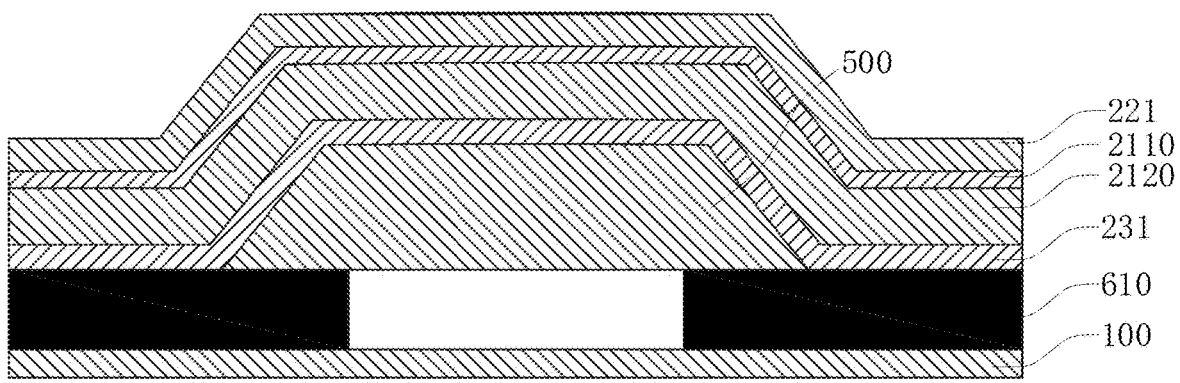
FIG. 8e is a fifth structural schematic view of the conductive enclosure structure according to some embodiments of the present disclosure.
Figure 8F:
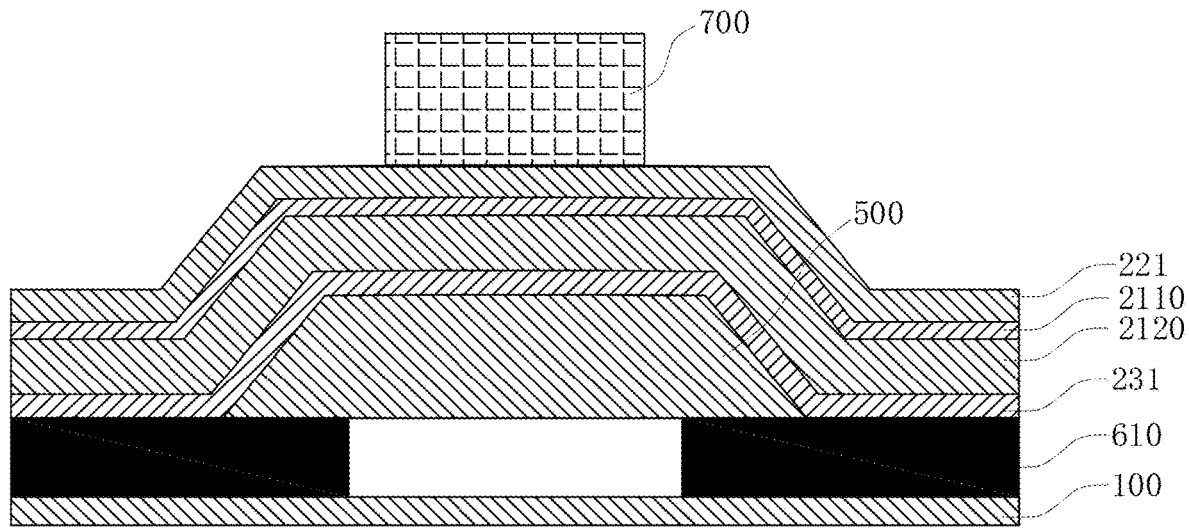
FIG. 8f is a sixth structural schematic view of the conductive enclosure structure according to some embodiments of the present disclosure.
Figure 8G:
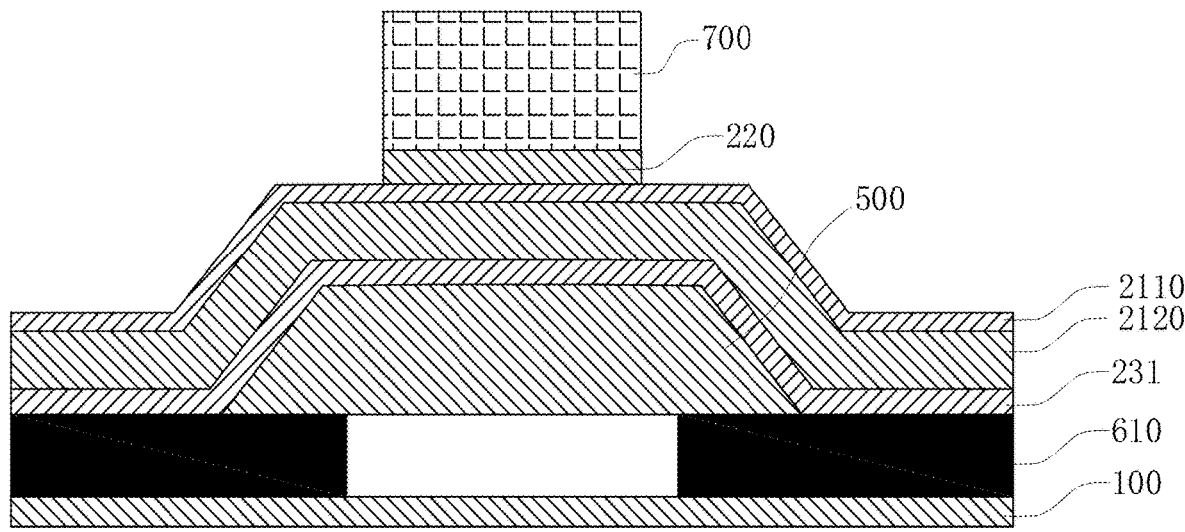
FIG. 8g is a seventh structural schematic view of the conductive enclosure structure according to some embodiments of the present disclosure.
Figure 8H:
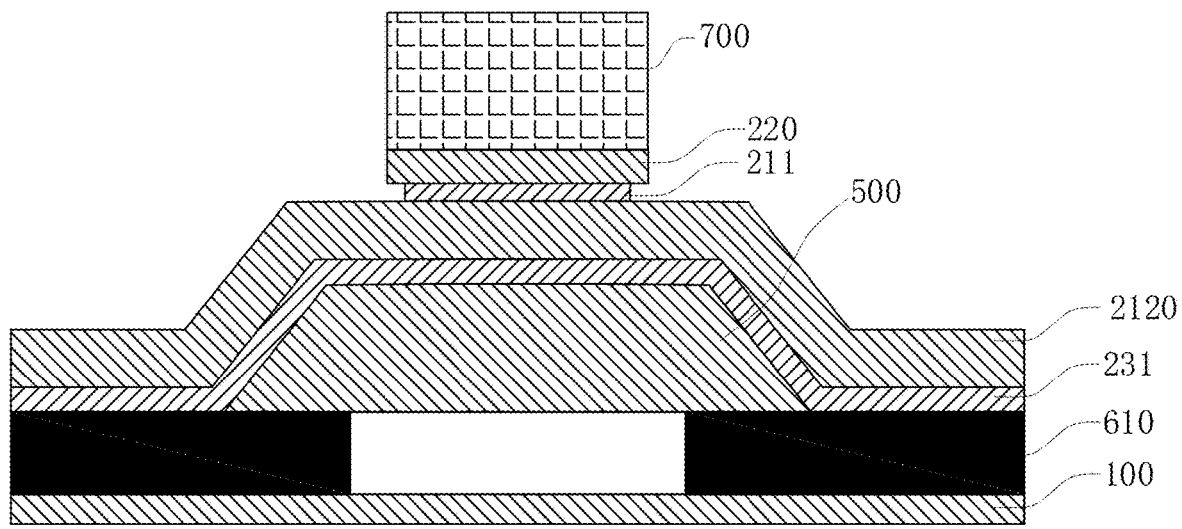
FIG. 8h is an eighth structural schematic view of the conductive enclosure structure according to some embodiments of the present disclosure.
Figure 8I:
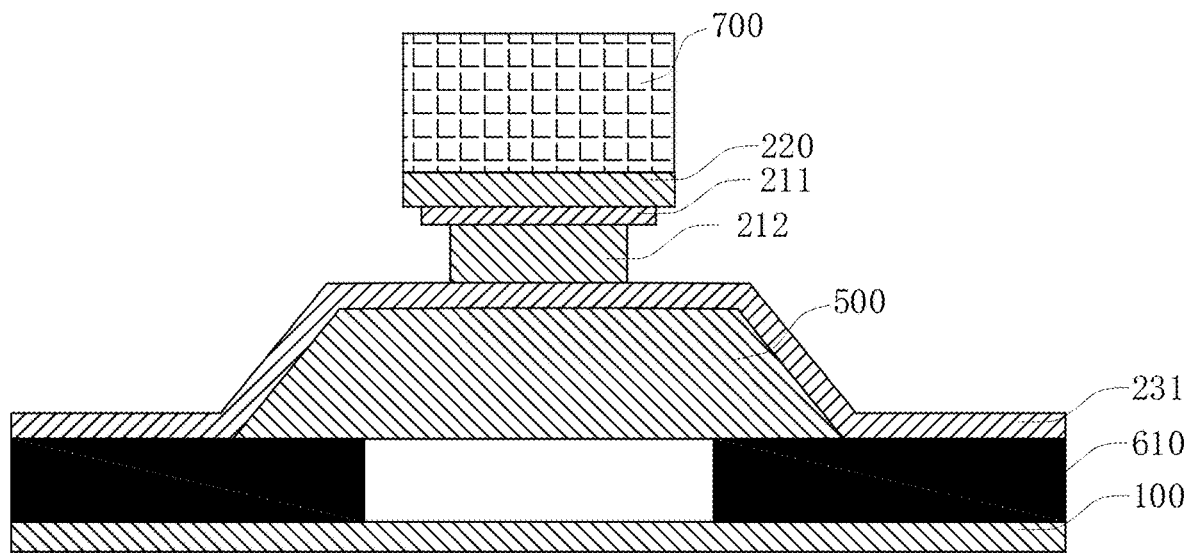
FIG. 8i is a ninth structural schematic view of the conductive enclosure structure according to some embodiments of the present disclosure.
Figure 8J:
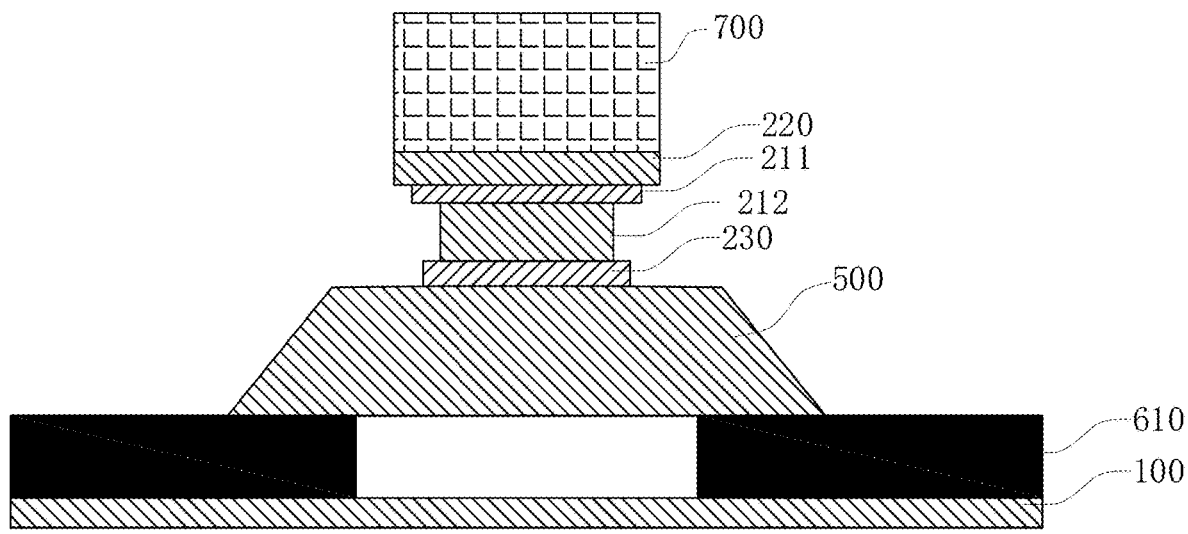
FIG. 8j is a tenth structural schematic view of the conductive enclosure structure according to some embodiments of the present disclosure.
Figure 8K:
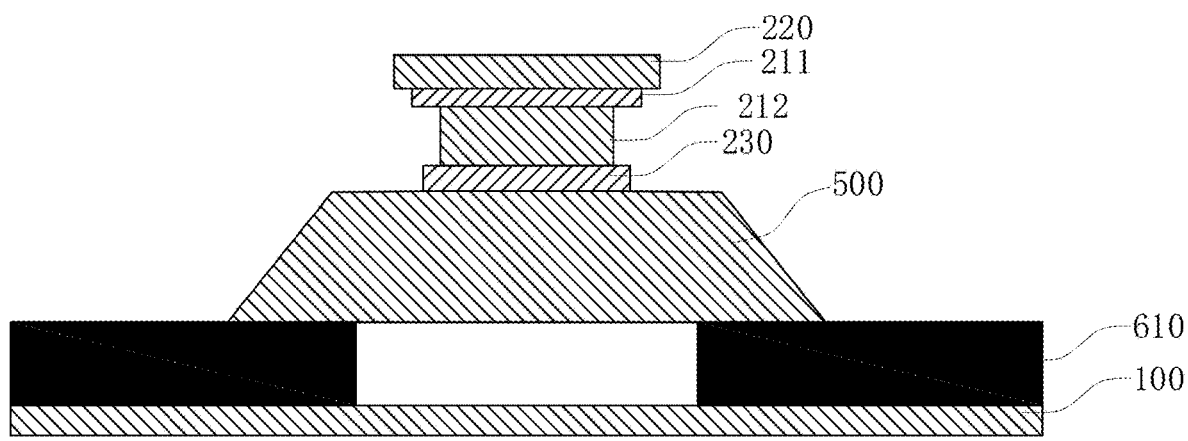
FIG. 8k is an eleventh structural schematic view of the conductive enclosure structure according to some embodiments of the present disclosure.

In some embodiments, as shown in FIG. 8 to FIG. 8*k*, the method of sequentially forming a second metal layer 230, an insulation layer 210, and the plurality of first metal layers 220 on the pixel definition layer 500 along the direction away from the pixel definition layer 500, includes the following operations.

At block S1211, an original layer 231 of second metal layer, an original layer 2120 of second insulation layer, an original layer 2110 of first insulation layer and an original layer 221 of first metal layer are sequentially formed on the pixel definition layer 500. The original layer 231 of second metal layer covers the anode 610 and the pixel definition layer 500. A width of the original layer 231 of second metal layer, a width of the original layer 2120 of second insulation layer, a width of the original layer 2110 of first insulation layer, and a width of the original layer 221 of first metal layer are the same.

At block S1212, a photoresist layer 700 is coated on a side of the original layer 221 of first metal layer away from the original layer 2110 of first insulation layer.

At block S1213, the photoresist layer 700 is patterned, and based on the patterned photoresist layer 700, etching processes are performed sequentially to obtain the plurality of first metal layers 220, the first insulating layer 211, the second insulating layer 212, and the second metal layer 230. Each of the width of the insulation layer 210 and the second metal layer 230 are less than the width each of the plurality of first metal layers 220, and the photoresist layer 700 is removed.

Figure 9:
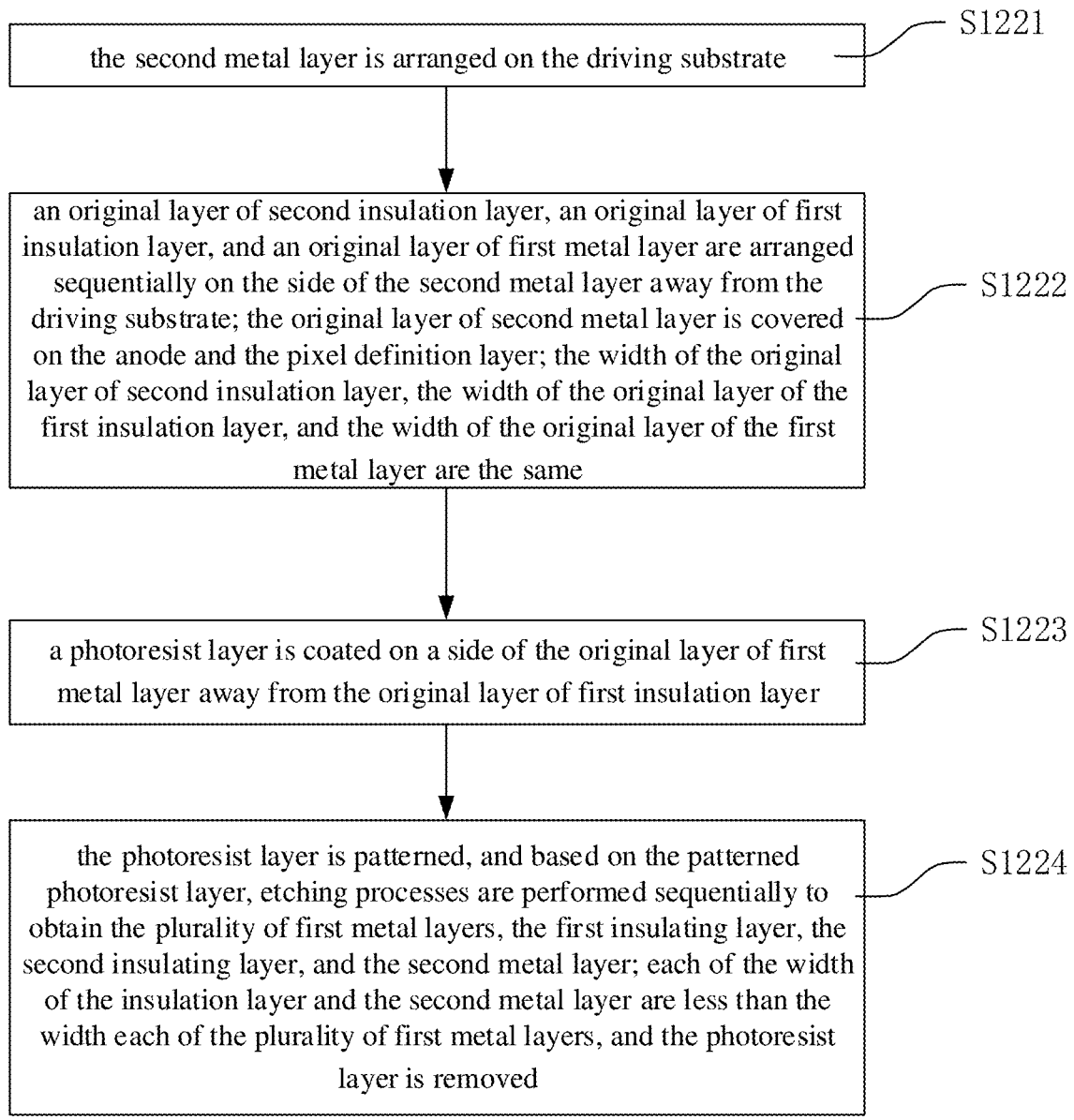
FIG. 9 is a second flow chart of a method of for manufacturing the conductive enclosure structure according to some embodiments of the present disclosure.
Figure 9A:
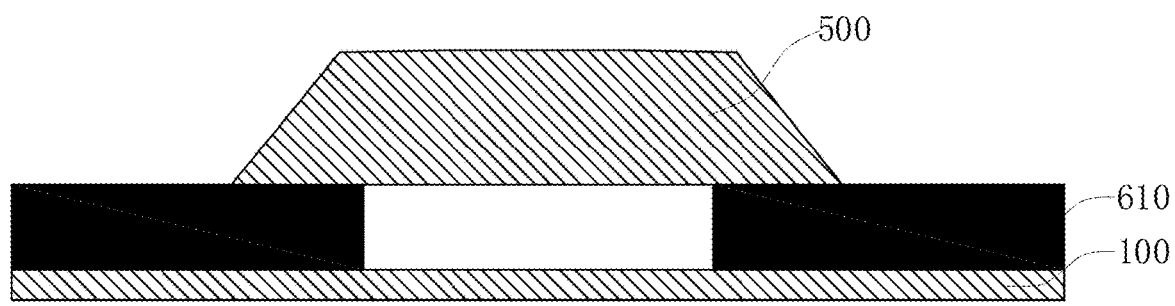
FIG. 9a is a first structural schematic view of the conductive enclosure structure according to some embodiments of the present disclosure.
Figure 9B:
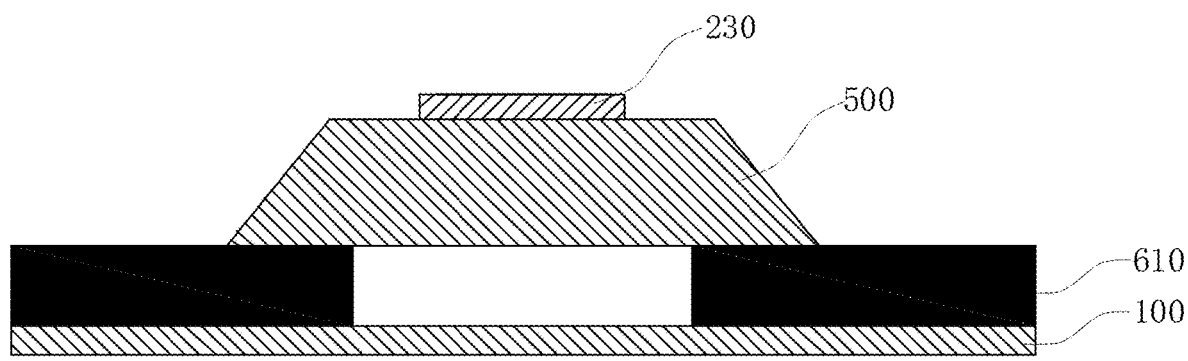
FIG. 9b is a second structural schematic view of the conductive enclosure structure according to some embodiments of the present disclosure.
Figure 9C:
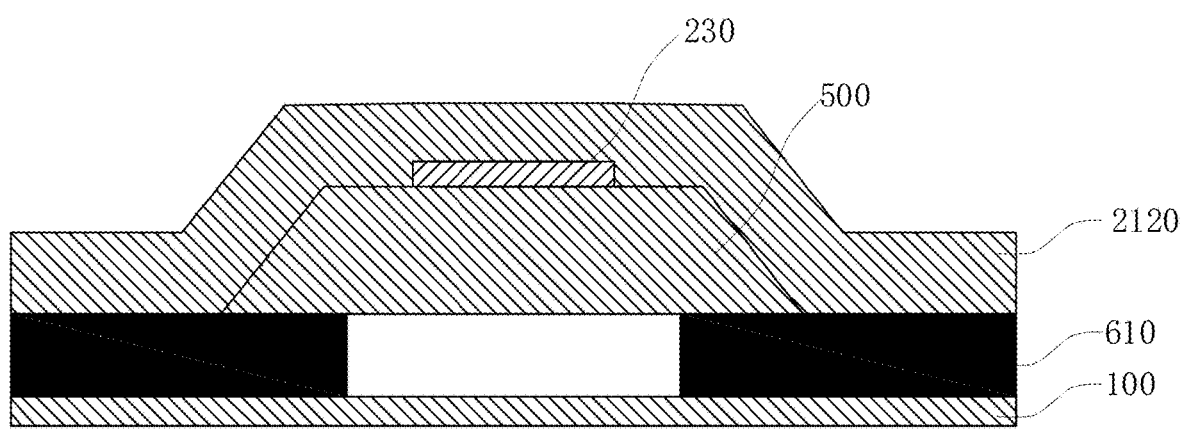
FIG. 9c is a third structural schematic view of the conductive enclosure structure according to some embodiments of the present disclosure.
Figure 9D:
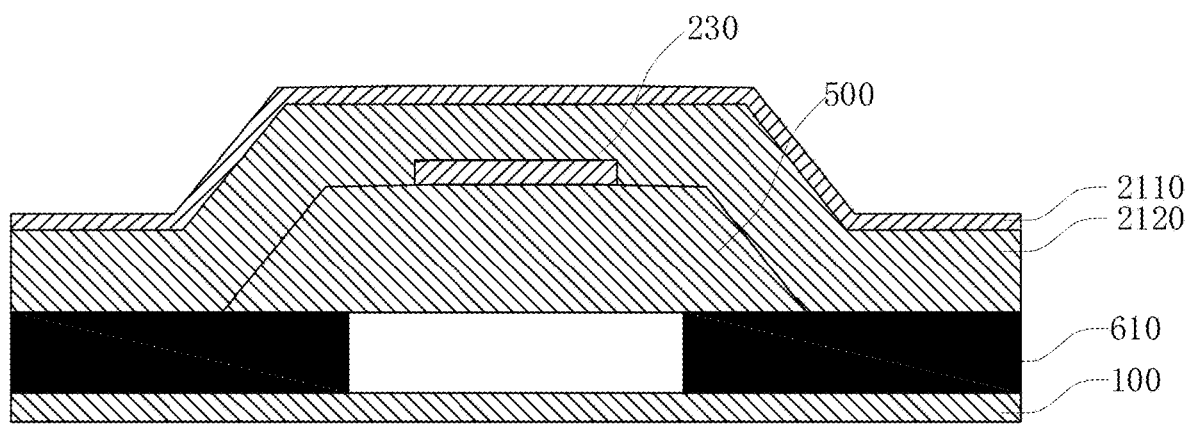
FIG. 9d is a fourth structural schematic view of the conductive enclosure structure according to some embodiments of the present disclosure.
Figure 9E:
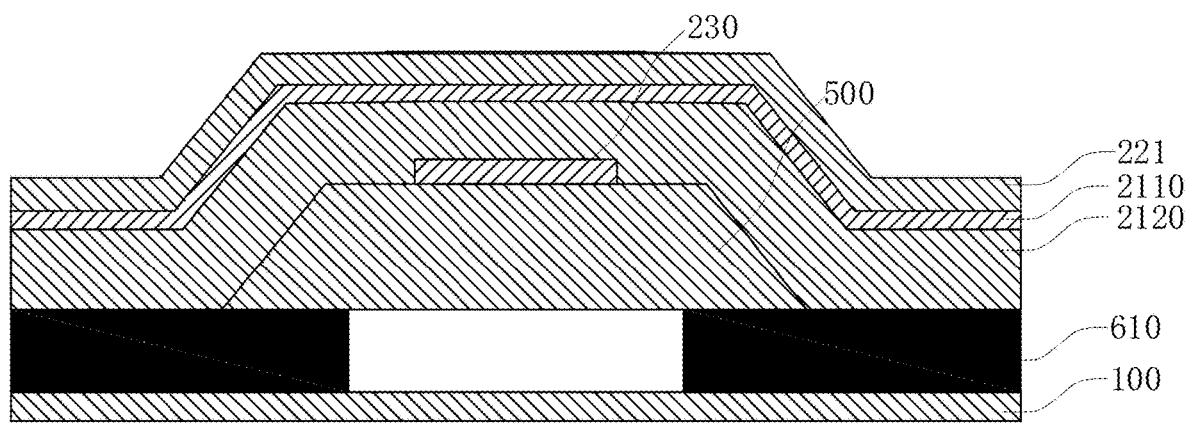
FIG. 9e is a fifth structural schematic view of the conductive enclosure structure according to some embodiments of the present disclosure.
Figure 9F:
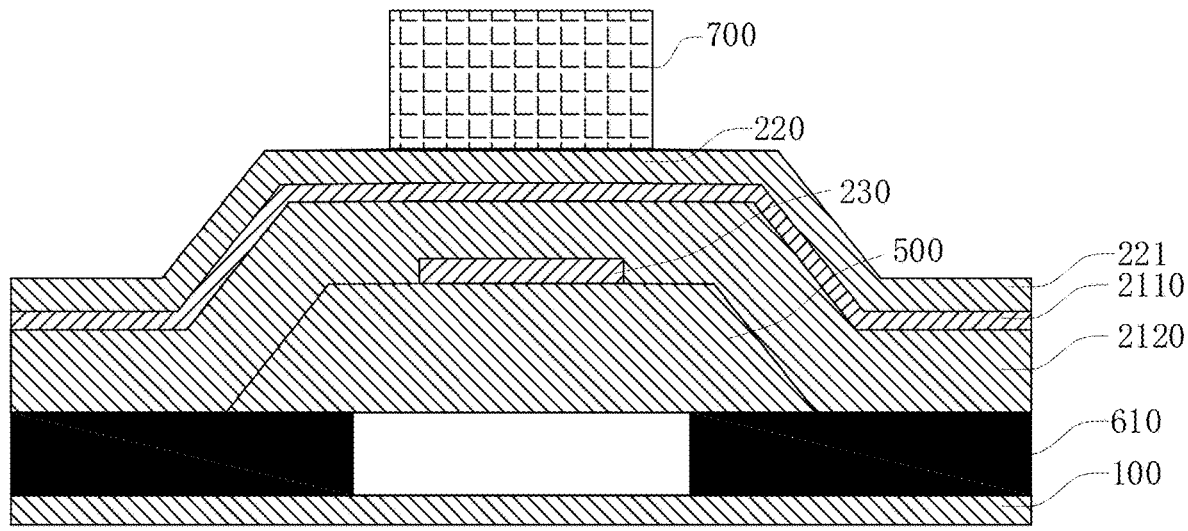
FIG. 9f is a sixth structural schematic view of the conductive enclosure structure according to some embodiments of the present disclosure.
Figure 9G:
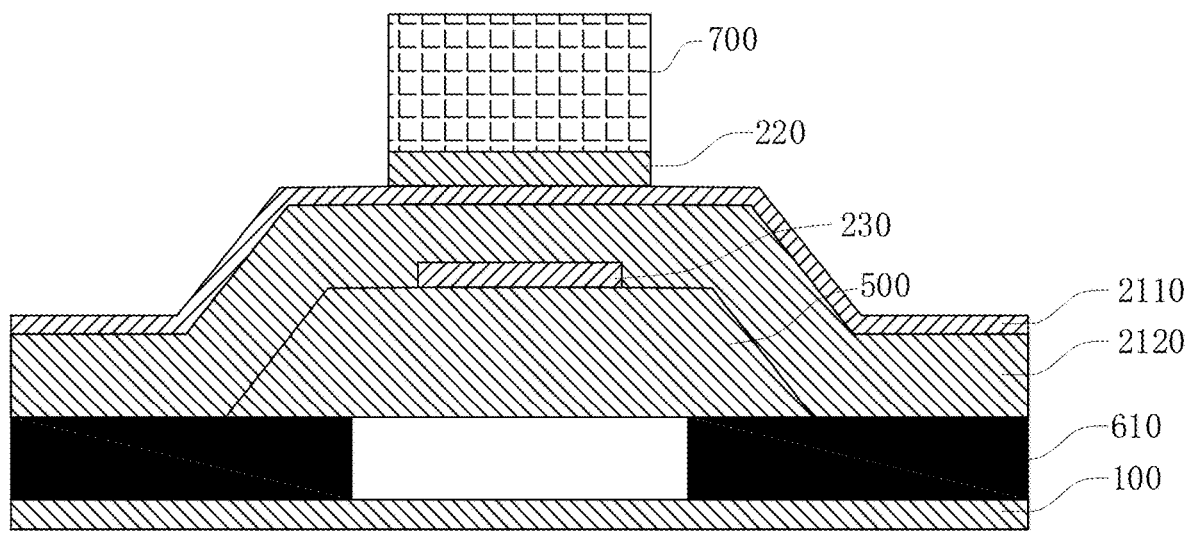
FIG. 9g is a seventh structural schematic view of the conductive enclosure structure according to some embodiments of the present disclosure.
Figure 9H:
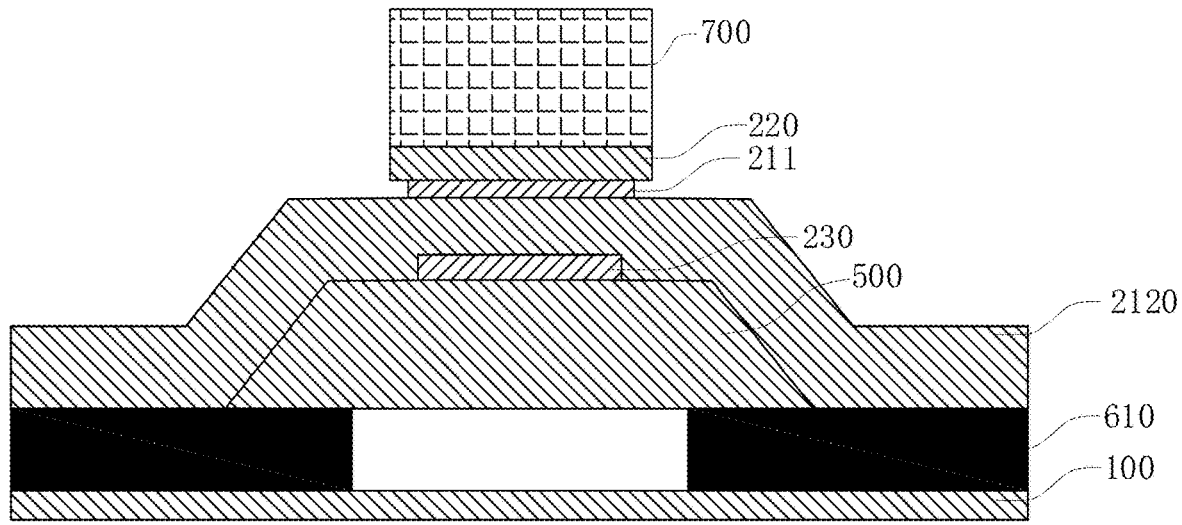
FIG. 9h is an eighth structural schematic view of the conductive enclosure structure according to some embodiments of the present disclosure.
Figure 9I:
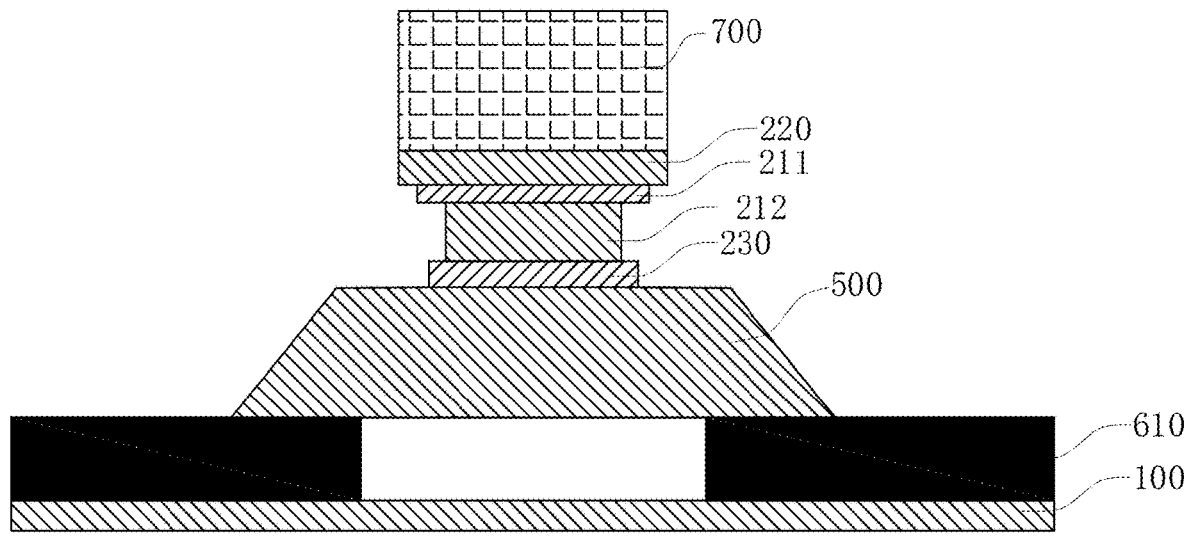
FIG. 9i is a ninth structural schematic view of the conductive enclosure structure according to some embodiments of the present disclosure.
Figure 9J:
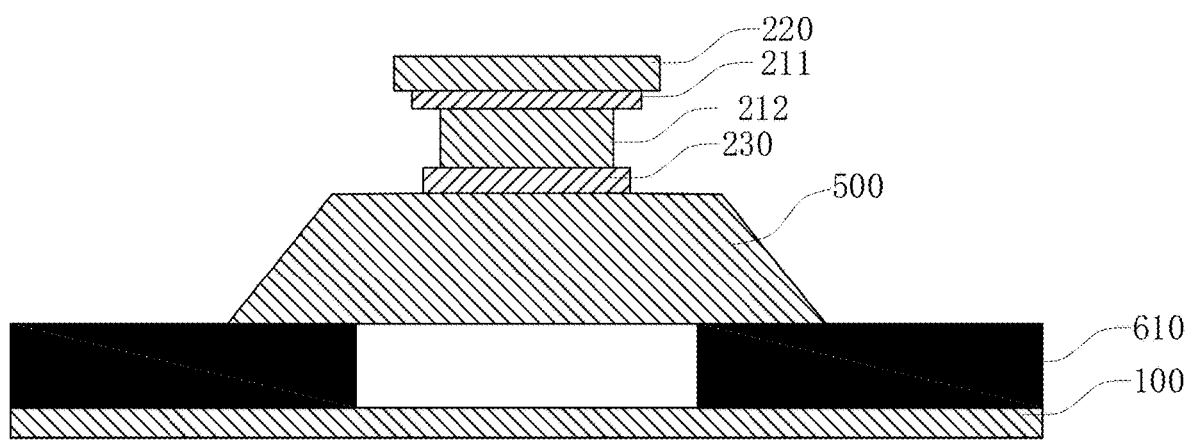
FIG. 9j is a tenth structural schematic view of the conductive enclosure structure according to some embodiments of the present disclosure.

In another embodiment, as shown in FIG. 9 to FIG. 9*j*, the method of sequentially forming a second metal layer 230, an insulation layer 210, and the plurality of first metal layers 220 on the pixel definition layer 500 along the direction away from the pixel definition layer 500, includes the following operations.

At block S1221, the second metal layer 230 is arranged on the driving substrate 100.

At block S1222, the original layer 2120 of second insulation layer, the original layer 2110 of first insulation layer, and the original layer 221 of first metal layer are stacked sequentially on the side of the second metal layer 230 away from the driving substrate 100. The original layer 231 of second metal layer is covered on the anode 610 and the pixel definition layer 500. The width of the original layer 2120 of second insulation layer, the width of the original layer 2110 of first insulation layer, and the width of the original layer 221 of first metal layer are the same.

At block S1223, the photoresist layer 700 is coated on a side of the original layer 221 of first metal layer away from the original layer 2110 of first insulation layer.

At block S1224, the photoresist layer 700 is patterned, and based on the patterned photoresist layer 700, etching processes are performed sequentially to obtain the plurality of first metal layers 220, the first insulating layer 211, the second insulating layer 212, and the second metal layer 230. Each of the width of the insulation layer 210 and the second metal layer 230 are less than the width each of the plurality of first metal layers 220, and the photoresist layer 700 is removed.

On the other hand, a display device may be further provided by some embodiments of the present disclosure. The display device includes the above-mentioned display panel.

In the present disclosure, unless specified or limited otherwise, terms "arranged" and "connected" etc. should be understood in a broad sense. For example, "connected" may be a fixed connection, a detachable connection, or an integral connection. It can be a mechanical connection or an electrical connection. It may be a direct connection or an indirect connection through an intermediate medium. It may be the communication between interior of two elements or the interaction between two elements. For those ordinary skilled in the art, the specific meanings of the aforementioned terms in the present disclosure may be understood according to specific conditions.

In the description of the specification, descriptions of reference terms "some embodiments", etc., are intended to indicate that particular features, structures, materials, or characteristics described with reference to the embodiment or example are included in at least one embodiment or example of the present disclosure. In the specification, schematic descriptions of the foregoing terms do not need to aim at a same embodiment or example. Besides, the specific features, the structures, the materials or the characteristics that are described may be combined in a proper manner in any one or more embodiments or examples. Moreover, different embodiments or examples and features of different embodiments or examples described in the specification may be synthesized and combined by those skilled in the art as long as no conflict occurs.

Although the embodiments of the present disclosure are shown and described above, it may be understood that the foregoing embodiments are examples, and cannot be understood as limitations to the present disclosure. Those skilled in the art may make changes, modifications, replacements, and variations to the foregoing embodiments without departing from the scope of the present disclosure. Therefore, any change or modification made according to the claims and the specification of the present disclosure should fall within the scope of the present disclosure.

What is claimed is:

1. A display panel, comprising:
   a driving substrate;
   a conductive enclosure structure arranged on the driving substrate, wherein the conductive enclosure structure comprises an insulation layer and a plurality of first metal layers, the insulation layer and the plurality of first metal layers are stacked in sequence along a direction away from the driving substrate, and the plurality of first metal layers are arranged at intervals on a same plane; and
   a touch control electrode layer arranged on a side of the conductive enclosure structure away from the driving substrate, wherein the touch control electrode layer comprises a plurality of first touch control electrodes, the plurality of first touch control electrodes extend to the plurality of first metal layers, and adjacent electrodes of the plurality of first touch control electrodes are bridged through a corresponding one of the plurality of first metal layers;
   wherein the conductive enclosure structure further comprises a second metal layer arranged on a side of the insulation layer away from the first metal layer, and a width of the first metal layer is greater than a width of the second metal layer.

2. The display panel according to claim 1, wherein the touch control electrode layer further comprises a plurality of second touch control electrodes, the plurality of second touch control electrodes are insulated from the plurality of first touch control electrodes, and the plurality of first touch control electrodes is intersecting with the plurality of second touch control electrodes on a same layer.

3. The display panel according to claim 2, wherein the display panel further comprises an organic protection layer arranged between the touch control electrode layer and the plurality of first metal layers, the organic protection layer extends between adjacent layers of the plurality of first metal layers, the plurality of second touch control electrodes are insulated from the plurality of first touch control electrodes through the organic protection layer, and the adjacent layers of the plurality of first metal layers are insulated from each other through the organic protection layer.

4. The display panel according to claim 3, wherein each of the plurality of first touch control electrodes comprises a first bridging portion and a second bridging portion, and the first bridging portion corresponding to one of the adjacent electrodes of the plurality of first touch control electrodes and the second bridging portion corresponding to the other of the adjacent electrodes of the plurality of first touch control electrodes are connected to a same first metal layer.

5. The display panel according to claim 4, wherein the first bridging portion and the second bridging portion are arranged at intervals, and the second touch control electrode passes through an interval between the first bridging portion and the second bridging portion.

6. The display panel according to claim 2, wherein at least one of the plurality of first touch control electrodes is disconnected at an intersection between the at least one of the plurality of first touch control electrodes and at least one of the plurality of second touch control electrodes, and is bridged through the first metal layer.

7. The display panel according to claim 1, wherein a material of the first metal layer or the second metal layer comprises indium zinc oxide, copper, or aluminum.

8. The display panel according to claim 1, further comprising:
   a pixel definition layer arranged on the driving substrate, wherein the conductive enclosure structure is arranged on a side of the pixel definition layer away from the driving substrate, the pixel definition layer and the conductive enclosure structure protrude from the driving substrate to enclose and form a pixel accommodation region;
   a plurality of sub pixels arranged in the pixel accommodation region, wherein each of the plurality of sub pixels comprises:
   an anode, arranged on the driving substrate in the pixel accommodation region;
   an organic light-emitting layer, arranged on the anode; and
   a cathode, arranged on the organic light-emitting layer and in contact with the second metal layer of the conductive enclosure structure.

9. The display panel according to claim 8, wherein an evaporation angle of the organic light-emitting layer is greater than the evaporation angle of the cathode during an evaporation of the organic light-emitting layer.

10. The display panel according to claim 8, wherein a material of the anode comprises aluminum, silver and oxides thereof, indium tin oxide, indium zinc oxide, a stack of metal and indium tin oxide, or a stack of metal and indium tin oxide;
    a material of the cathode comprises a metal material such as aluminum, gold, silver, aluminum magnesium alloy.

11. The display panel according to claim 8, further comprising:
- an insulation protection layer, arranged on the cathode and extending along the conductive enclosure structure to the first metal layer of the conductive enclosure structure; and
- a first encapsulation layer arranged on the insulation protection layer, wherein a height of the first encapsulation layer is at least higher than a height of the conductive enclosure structure.

12. The display panel according to claim 11, wherein the insulation layer comprises a first insulation layer and a second insulation layer, the first insulation layer is arranged close to the first metal layer, and the second insulation layer is arranged close to the second metal layer.

13. The display panel according to claim 12, wherein a width of the second insulation layer is less than a width of the first insulation layer, and the width of the second insulation layer is less than a width of the first metal layer.

14. The display panel according to claim 11, further comprising a plurality of second encapsulation layers arranged between the first encapsulation layer and the organic protection layer;
- wherein the plurality of second encapsulation layers are arranged in the plurality of sub pixels in one-to-one correspondence, and are disposed on two corresponding sides of the first bridge section and the second bridge section.

15. The display panel according to claim 14, wherein the second encapsulation layer and the insulation protection layer are arranged above the first metal layer at intervals.

16. The display panel according to claim 14, wherein the second encapsulation layer is overlapped with the insulation protection layer above the first metal layer.

17. The display panel according to claim 11, wherein the first encapsulation layer is arranged between the organic protection layer and the insulation protection layer.

18. The display panel according to claim 11, wherein the first encapsulation layer is an inorganic encapsulation layer, and a material of the first encapsulation layer comprises silicon nitride, silicon oxynitride, a combination thereof.

19. A display device, comprising a display panel;
wherein the display panel comprises:
- a driving substrate;
- a conductive enclosure structure arranged on the driving substrate, wherein the conductive enclosure structure comprises an insulation layer and a plurality of first metal layers, the insulation layer and the plurality of first metal layers are stacked in sequence along a direction away from the driving substrate, and the plurality of first metal layers are arranged at intervals on a same plane; and
- a touch control electrode layer arranged on a side of the conductive enclosure structure away from the driving substrate, wherein the touch control electrode layer comprises a plurality of first touch control electrodes, the plurality of first touch control electrodes extend to the plurality of first metal layers, and adjacent electrodes of the plurality of first touch control electrodes are bridged through a corresponding one of the plurality of first metal layers;
wherein the conductive enclosure structure further comprises a second metal layer arranged on a side of the insulation layer away from the first metal layer, and a width of the first metal layer is greater than a width of the second metal layer.

* * * * *